UNITED STATES PATENT OFFICE.

VICENTE M. BACA, OF DENVER, COLORADO.

TABLE-SYRUP.

No. 831,403.

Specification of Letters Patent.

Patented Sept. 18, 1906.

Application filed January 8, 1906. Serial No. 295,143.

*To all whom it may concern:*

Be it known that I, VICENTE M. BACA, a citizen of the United States, residing at Denver, in the county of Denver and State of Colorado, have invented a new and useful Food Compound, of which the following is a specification.

My invention is in the nature of a new food compound in the form of a table-syrup designed for use on griddle-cakes and the like; and it consists in a new product of a very palatable character and high dietic quality and one which also has a certain therapeutic value, there being no hurtful mineral ingredients and no low-grade adulterants.

In preparing my new compound I take of cane-sugar five pounds and dissolve it in two gallons, more or less, of pure water or a sufficient quantity to make when boiled down a saturated and permanent syrup. Into this solution I place several clusters or bunches of thoroughly-cleaned celery, which is preferably used whole, but may be chopped up, if desired. A larger or smaller quantity of celery may be used, according to the strength of the flavor desired. The mixture is then boiled for four hours, more or less. At the end of this operation the celery as a solid substance practically disappears and the vegetable juices and extractive flavors of the celery are all absorbed by and incorporated with the syrup and the latter is reduced to a saturated and stable syrup. The pure liquid is then strained off and allowed to cool and is bottled or put up in cans for use.

The product thus formed is a delicious article for table use, of first-class digestive and dietetic value, and having also the therapeutic quality of a nerve stimulant and without any deleterious or objectionable ingredient whatever.

The syrup will keep in any climate an indefinite period of time.

I claim—

A new food compound consisting of cane-sugar syrup and celery incorporated substantially as described.

VICENTE M. BACA.

Witnesses:
 EDW. W. BYRN,
 T. O. MCCORKLE.